United States Patent
Kao

(10) Patent No.: US 6,374,222 B1
(45) Date of Patent: Apr. 16, 2002

(54) METHOD OF MEMORY MANAGEMENT IN SPEECH RECOGNITION

(75) Inventor: Yu-Hung Kao, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/354,486

(22) Filed: Jul. 16, 1999

Related U.S. Application Data

(60) Provisional application No. 60/096,204, filed on Aug. 12, 1998.

(51) Int. Cl.$^7$ .............................................. G10L 15/14
(52) U.S. Cl. ..................... 704/256; 704/241; 704/242
(58) Field of Search ................................ 704/201, 256, 704/232, 238, 239, 240, 241, 242

(56) References Cited

U.S. PATENT DOCUMENTS

| | | | | |
|---|---|---|---|---|
| 4,977,598 A | * | 12/1990 | Doddington et al. | 704/255 |
| 5,291,499 A | * | 3/1994 | Behrens et al. | 714/796 |
| 5,422,894 A | * | 6/1995 | Abe et al. | 714/755 |
| 6,230,128 B1 | * | 5/2001 | Smyth | 704/236 |

FOREIGN PATENT DOCUMENTS

EP  0 248 377 A2  12/1987

OTHER PUBLICATIONS

N. Deshmukh et al., "Efficient Search Strategies in Hierarchical Pattern Recognition Systems," Proceedings of the 27$^{th}$ Southeastern Symposium on System Theory, pp. 88–91, Mar. 1995.

Hui–Ling Lou, "Implementing the Viterbi Algorithm: Fundamentals and Real–Time Issues for Processor Designers," IEEE Signal Processing Magazine, vol. 12, No. 5, pp. 42–52, Sep. 1995.

Gennady Feygin et al., "Architectural Tradeoffs for Survivor Sequence Memory Management in Viterbi Decoders," IEEE Transactions on Communications, vol. 41, No. 3, pp. 425–429, Mar. 1993.

* cited by examiner

*Primary Examiner*—William Korzuch
*Assistant Examiner*—Daniel Abebe
(74) *Attorney, Agent, or Firm*—Robert L. Troike; Frederick J. Telecky, Jr.

(57) ABSTRACT

A memory management method is described for reducing the size of memory required in speech recognition searching. The searching involves parsing the input speech and building a dynamically changing search tree. The basic unit of the search network is a slot. The present invention describes ways of reducing the size of the slot and therefore the size of the required memory. The slot size is reduced by removing the time index, by the model_index and state_index being packed and by a coding for last_time field where one bit represents a slot is available for reuse and a second bit is for backtrace update.

4 Claims, 3 Drawing Sheets

METHOD OF MEMORY MANAGEMENT IN SPEECH RECOGNITION

This application claims priority under 35 USC §119(e)(1) of provisional application No. 60/096,204, filed Aug. 12, 1998.

TECHNICAL FIELD OF THE INVENTION

This invention relates to speech recognition and more particularly to memory management in a speech recognition search network.

BACKGROUND OF THE INVENTION

Speech recognition involves searching and comparing the input speech to speech models representing vocabulary to identify words and sentences. Continuous speech recognition is a resource-intensive algorithm. Commercial dictation software requires more than 10M bytes to install on the disk and 32M bytes RAM to run the application. Static memory is required to store the program (algorithm), grammar, dictionary, and acoustic models. These data will not change, therefore can be stored in disk or ROM. Dynamnic memory is required to run the search. The search involves parsing the input speech and building a dynamically changing search tree, therefore RAM is required for both Read and Write capabilities.

Most of the fast search algorithms involve multi-passes of search. Namely to use simple models (e.g. monophones) to do a quick rough search and output a much smaller N-best sub-space; then use detailed models (e.g. clustered triphones with mixtures) to search that sub-space and output the final results (see Fil Alleva et al. "An Improved Search Algorithm Using Incremental Knowledge for Continuous Speech Recognition," ICASSP 1993, Vol. 2, 307–310; Long Nguyen et al. "Search Algorithms for Software-Only Real-Time Recognition with Very Large Vocabulary," ICASSP, and Hy Murveit et al. "Progressive-Search Algorithms for Large Vocabulary Speech Recognition," ICASSP). The first pass of using monophones to reduce the search space will introduce error, therefore the reduced search space has to be large enough to contain the best path. This process requires a lot of experiments and fine-tuning.

The search process involves expanding a search tree according to the grammar and lexical constraints. The size of the search tree and the storage requirements grow exponentially with the size of the vocabulary. Viterbi beam search is used to prune away improbable branches of the tree; however, the tree is still very large for large vocabulary tasks.

Multi-pass algorithm is often used to speed up the search. Simple models (e.g. monophones) are used to do a quick rough search and output a much smaller N-best sub-space. Because there are very few models, the search can be done much faster. However, the accuracy of these simple models are not good enough, therefore a large enough N-best sub-space has to be preserved for following stages of search with more detailed models.

Another process is to use lexical tree to maximize the sharing of evaluation. See Mosur Ravishankar "Efficient Algorithms for Speech Recognition," Ph.D. thesis, CMU-CS-96-143, 1996. Also see Julian Odell "The Use of Context in Large Vocabulary Speech Recognition," Ph.D. thesis, Queens' College, Cambridge University, 1995. For example, suppose both bake and baked are allowed in a certain grammar node, much of their evaluation can be shared because both words start with phone sequence: /b// ey/ /k/. If monophones are used in the first pass of search, no matter how large the vocabulary is, there are only about 50 English phones the search can start with. This principle is called lexical tree because the sharing of initial evaluation, and then the fanning out only when phones differ looks like a tree structure. The effect of lexical tree can be achieved by removing the word level of the grammar, and then canonicalize (remove redundancy) the phone network. For example:

```
% more simple.cfg
start(<S>).
<S>---> bake | baked.
bake ---> b ey k.
baked ---> b ey k t.
% cfg_merge simple.cfg | rg_from_rgdag | \
   rg_canonicalize
start(<S>).
<S>---> b, Z_1.
Z_1 ---> ey, Z_2.
Z_2 ---> k, Z_3.
Z_3 ---> t, Z_4.
Z_3 ---> "".
Z_4 ---> "".
```

The original grammar has two levels: sentence grammar in terms of words, and pronunciation grammar (lexicon) in terms of phones. After removing the word level and then canonicalizing the one level phone network, same initial will be automatically shared. The recognizer will output phone sequence as the recognition result, which can be parsed (text only) to get the word. Text parsing takes virtually no time compared to speech recognition parsing.

It is desirable to provide a method to speed up the search and reduce the resulting search space that does not introduce error and can be used independently of muilti-pass search or lexical tree.

SUMMARY OF THE INVENTION

In accordance with one embodiment of the present invention, a method of memory management which includes while expanding a search tree removing slots in the storage space with bad scores and replacing the memory space with later slots which have better scores and more likely to match the input speech. The slots contain a last time field with a first bit used for slot allocation and test and a second bit for backtrace update.

DESCRIPTION OF PREFERRED EMBODIMENTS OF THE PRESENT INVENTION

Figure 1:
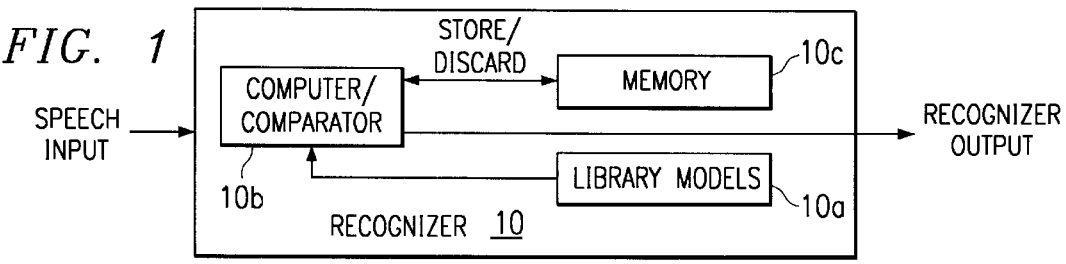
FIG. 1 is a block diagram of the system according to one embodiment of the present invention.
Figure 2:
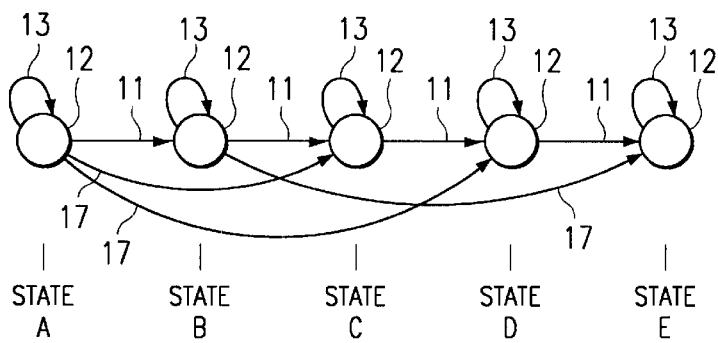
FIG. 2 illustrates states and transitions.

Referring to FIG. 1 there is illustrated a speech recognition system. The recognizer 10 includes a library 10a including a pronunciation dictionary, grammars, acoustic models, etc. The recognizer 10 further includes a computer/comparator 10b for comparing parsed input speech to the models and for computing a score and memory 10c for storing operation program and storing results from comparing and computing results. The parsed speech input is compared to speech models and the match produces the recognized output. The framework of our recognition system is HMM (Hidden Markov Model). Where the sentence grammar is represented by a Markov model with states 12 and transitions 11 among states (see FIG. 2). Transitions are associated with words. When a transition is taken from state A to state B, one of the words associated with that transition must be evaluated. Then from state B, there are again many outgoing transitions to choose from, each transition has words associated with it. Taking a transition means going through a word. This Markov model thus describes what words a sentence can start with, what words follow what words, and what words a sentence can end with. This is a computational representation of a grammar.

Each word is also represented by a Markov model with states and transitions. Acoustics are associated with each state. Transition into a state means evaluating the acoustics associated with that state. Usually a left-to-right HMM is used for word model, there are straight-through transitions 11 representing average speed of speaking, self-loop transitions 13 representing slow speed, and skip transitions 17 representing fast speed. Acoustics can also be associated with transitions (as in sentence HMM); however, in most speech recognition systems the acoustics are associated with states for its simplicity.

These two levels of HMM's describe the search space of a speech recognition system (see Y. H. Kao, W. Anderson, H. S. Lim, "A Multi-Lingual, Speaker-Independent, Continuous-Speech Recognizer on TMS320C5x Fixed-Point DSP," ICSPAT 1997, San Diego, USA and Y. H. Kao, "Fixed-Point Implementation of IG Speech Recognizer on C5x DSP," TI Tech Report, 1996). From the top level sentence grammar to the bottom level acoustics, the recognition algorithm (parser) can run the input acoustic vectors through this search space to find out the best path by building a search network. The best path found at the end of the input vectors is the recognition result. Grammars can be represented by context-free-grammar (for small vocabulary tasks) or N-Gram (for large vocabulary tasks). In a large vocabulary system, usually a three level system (sentence, word, phone) is used rather than the two level system (sentence, ivord). It is impossible to build individual word models for so many words, therefore, phonetic models are used as the base units (see Y. H. Kao, K. Kondo, "Phonetic Modeling Using Acoustic Decision Tree," TI Tech Report, 1997; Y. H. Kao, "Acoustic Decision Tree: A Tutorial," TI Tech Report, 1997; Y. H. Kao, "Acoustic Decision Tree: Performance Analysis," TI Tech Report, 1997).

Figure 3:
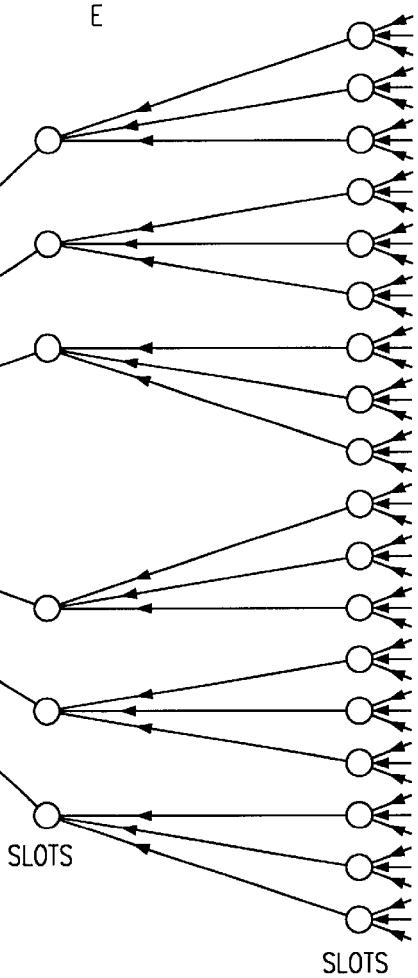
FIG. 3 illustrates path expansion slots and pointers back to previous slots.

Search is expanding all the possible paths in the grammar (see FIG. 3). When a speech frame comes in, first we expand all the possible word in the sentence HMM. To expand each word, we need to expand their individual phone sequence in the lexicon HMM. To expand each phone, we need to expand their phonetic HMM's, which has acoustics as the observations. There are three levels of HMM in the structure. The upper level transitions may take more than one speech frame, only the bottom level transitions consume exactly one speech frame. A speech frame is, for example, 20 milliseconds long. The upper level transition can be taken only after its corresponding observation is completed (which may take several speech frames).

Speech recognition is to expand a search network following the grammar-word search space definition. There are many ways of actually defining the computer data structure and implementing the algorithm. We will use our algorithm as an example and describe the ways to minimize the network.

We define a structure called slot as the building block of the search network. Using a C structure, it is defined as:

```
struct slot {
    int         model_index;
    int         state_index;
    float       score;
    struct      slot *backptr;
    int         time;
    int         last_time;
    struct      slot *next_state;
    struct      slot *next_word;
}
```

Model_index is an integer representing what model this slot is at. For example, the whole search space is represented by one sentence model, we assign model_index 0 to the sentence model. This sentence model is composed of many words and how these words can be put together, we assign model_index 1, 2, 3, . . . etc. for each of the word models. Model_index can not overlap, each index represents a different model (sentence or words).

State_index is an integer representing what state (in a model, be it sentence or words) this slot is at. Both sentence and word models are HMM's, they are evaluated state by state. When building the search network, we need to know which state we are at, so we know what next state(s) to transition to. Within each model, state_index starts from 1, 2, 3, . . . etc. State 1 in model 1 is different from state 1 in model 2.

Score is the accumulated score of this path up to this slot.

Backptr is a pointer that points back to the previous slot in the path. For example, if state 10 can come from state 9 (straight-through transition), or state 8 (skip transition), or state 10 (self-loop transition); after Viterbi decoding which keeps only the best path coming into a state, the backptr of the state 10 slot will point to one of the three slots described above.

Time is the time index when this slot is first created. For example, we use 20 ms frame length. The input speech is segmented into 20 ms frames, preprocessed to extract a feature vector, then fed into the search algorithm. During the search of the first frame (0–20 ms), time is 1; during the search of the second frame (20–40 ms), time is 2, it goes on like this.

Last_time is the last time this path is updated. We need this time stamp for slot management (garbage collection). Expansion of the search network is an exponential growth problem, bad scored paths have to be pruned to reduce the size of search network. When a path has good score and should be retained for future expansion, we propagate the current time stamp backward through the whole path (a path is a backward linked list of slots). If the last_time of a slot is the current time, it must be retained and can not be reused. Otherwise, it can be reused because its path is not within the search beam and thus last_time not updated.

Next_state points to the next slot of active state within this model to be evaluated. When evaluating a model, many states can be active and need to be evaluated, they are linked together by next_state.

Next_word points to the next slot of active word for this sentence state to be evaluated. When evaluating a sentence model, its slots of active states are linked by next_state. But for each state, it has words that are still being evaluated (a word needs more than one frame to complete). Next_word links all these pending word evaluation slots. Next_word will start from a sentence level slot.

Search is the most complicated part of the speech recognition algorithm. The best way to learn the algorithm is to trace the C code.

Figure 4:
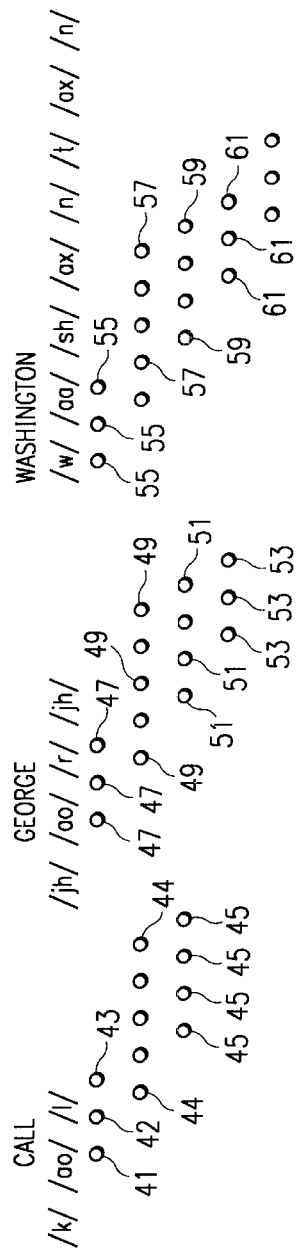
FIG. 4 illustrates expansion of a sentence.

FIG. 4 illustrates an example of the search space for the sentence grammar "Call George Washington," The layers of grammars are sentences, words, phones and acoustic distributions (bottom layer) represented by the small circles. The expansion goes from word "call" to phone "|K|" to the top three circles 44–43 for the acoustics of "|K|". The expansion then goes to the second phone "|ao|" to the five circles 44 and then back to the phone "|l|". The expansion then goes to the acoustics for "|l|" represented by the small circles 45. After the last circle 45, the expansion goes to the word "George" then to the phone "|jh|". The expansion continues with the three acoustics 47, then the phone "|ao|" and then the five acoustics 49. After the last acoustic 49, the search goes to the phone "|r|", followed by the four acoustics followed by the phone "|jh|", followed by the three acoustics 53. The last acoustic 53 is followed by the word "Washington" followed by the phone "|w|". This is followed by the three acoustics 55. The acoustics 55 are followed by the phone "|ao|" followed by the five acoustics 57, followed by the phone "|sh|". The phone "|sh|" is followed by its four acoustics 59, followed by the phone "|ax|" and its three acoustics 61. The expansion continues similarly for the phones "|n|", "|t|", "|ax|" and "|n|" followed by their associated three acoustics.

For the sake of continuing our discussion, we will describe the idea of search in a high level, and then explain the search network minimization process.

After defining, the slot data stricture as the building block of the search network, it is straightforward to do the search network expansion. It can be summarized as:
Build slots for all the sentence states where a sentence can start with
For (each input acoustic vector) {
  For (each sentence state slot) {
    Find all the words that are associated with its outgoing transition
    build word start slots and maintain still-in-evaluation word slots
    For (each word state slot) {
      Transition to next state and evaluate an acoustic vector
      If (reach word end) {
        Pass the info to sentence level for next sentence state transition
      }
    }
  }
}
Back-trace the best score path and report recognition result For each input acoustic vector (20 ms), we have to traverse down the search space as shown, for example, in FIG. 4 to reach the bottom layer so an acoustic evaluation can be done. The acoustic score and the transition score are accumulated and stored in the score field of the slot (put in storage 10c of FIG. 1). The backptr field points to previous slot (where this slot comes from). Therefore, for each input acoustic vector, the evaluation will add at least one slot to the search path because one acoustic evaluation has to be done. Sometimes more than one slot has to be added to the path because sentence level slot has to be added before the acoustic evaluation slot can be added.

This is called trace mode, every input acoustic vector is mapped into a model acoustic vector and recorded in the search path. It is very expensive because a very long linked list of slots is created. For example, a 5-second input utterance has 5×50=250 input vectors. A linked list of more than 250 slots has to be created for every possible theory within the search beam width.

For training purpose, this is necessary because every input vector needs to be mapped to a model vector in order to update that model vector. But for recognition purpose, this is an overkill because we only want to know what words are recognized. We do not need to know the microscopic trail of how each vector is mapped. In accordance with the present invention, the size of the slot is reduced.

Now let's study the information contained in a slot in more detail; specifically, we would like to examine if these fields are necessary in the search process. Basically, we can approach this problem from three directions:
  Some data are designed for diagnostic purpose, and are not essential for the algorithm. Obviously they can be discarded.
  Some data simply do not have a large dynamic range and thus can be stored in a smaller unit, or packed with other data.
  Some data are necessary for the algorithm; however, there may exist other alternatives that can achieve the same objective with less amount of data.

All three were found in our original slot definition. By applying these principles we are able to reduce the slot definition from 8 fields to 5 fields without changing the search algorithm. Please note that this design is aimed for fixed-point Digital Signal Processor (DSP) implementation, all the data fields are 16-bit words. On a DSP implementation, RAM size is a critical cost factor because RAM occupies a large percentage of the total die size. ROM, on the other hand, is much cheaper in silicon real estate.

Time is the time index when the slot is first created. For recognition purpose, there is no need to know the time. We only want to know what words are recognized, not where these words lie in the utterance time-wise. For update purpose, we do need to know the exact time mapping of input frame to model frame (frame means a 20 ms acoustic vector). However, the complete trace path has to be maintained for the update purpose, we can recover the time for each slot by counting the slots that map to acoustic models. For example, for a 5 seconds utterance, the trace mode path will have more than 5×50=250 slots. Of the more than 250 slots, exactly 250 slots will map to acoustic models; others are sentence level slots or bookkeeping slots that do not map to any input frame.

If the minimized path is used, the time is lost without the time field. If the trace mode path is used, we can recover the time from counting, even without the time field.

In the present recognition system, all sentence grammars are merged into one sentence grammar. Therefore, there is only one sentence model, its model_index is always 0. For the 10-digit task, there are 11 digit models×2 genders+1 silence model=23 models; their model_indices go from, 1 to 23. Using 8 bits for model_index can handle 255 models.

State_index needs to accommodate the largest number of states in all models, including both word models and sentence model. If 8 bits are used for state_index; given our 20 ms frame definition and using the common left-to-right HMM word model structures; 255 states means 255*20 ms=5.1 seconds word model. It is pretty safe to say that we will not need more than 8 bits for state_index in a word model. If phonetic models are used, it is less of a problem because phonetic models are smaller than word models.

However, state_index also needs to handle the largest number of states in the sentence model. It is more difficult to bound the number of states in a sentence model. For the 10-digit grammar, there are 11 sentence states. For the single word recognition grammar. There are 2 sentence states no matter how many words are included in the grammar. Therefore, it is pretty safe to use 8 bits for state_index for small vocabulary tasks. But for large vocabulary and more complicated grammars, it is very likely to have more than 255 sentence states.

By the above argument, we can pack model_index and state_index into one 16 bits word, giving each 8 bits. They can be easily unpacked into 16 bits each if the limits are exceeded. Software checks of these limits are added to prevent illegal packing.

Last_time is required in the slot management mechanism. Slot allocation and garbage collection happen very often. Even for a small vocabulary task, hundreds of slots are allocated and freed for every 20 ms input acoustic vector. Large vocabulary tasks will allocate and free slots a lot more. We can not rely on the C functions: malloc( ) and free( ) to do the job because they are very expensive both time-wise and memory-wise. It is thus handled by our own algorithm.

If the peak slot usage of a task is 2000, then 2000 slots are allocated at the beginning first, and last_time initialized to −2. When the recognition algorithm needs a slot, it will check the last_time field to see if it is less than current time−1. If it is, then this slot can be reused. The reason that we use current time−1 instead of current time as the criterion is because we are expanding from current time−1 slots into current time slot, therefore current time−1 slots are still needed.

If the score of a path is within the search beam width, the last_time of all the slots on the path are back traced and updated to current time. That means they can not be reused.

Figure 5:
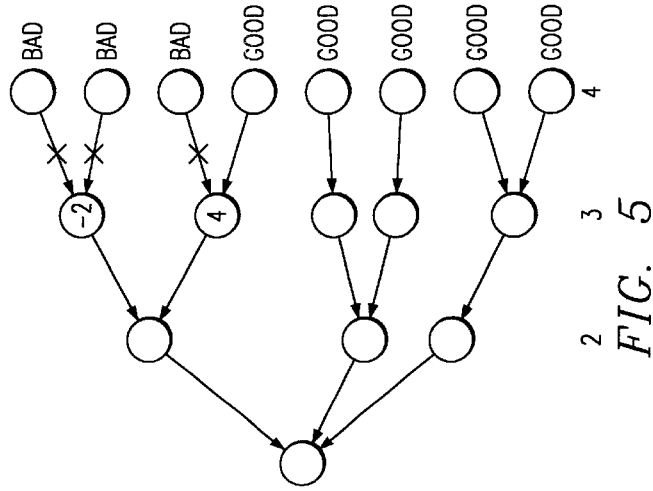
FIG. 5 illustrates slot expansion.

Also after the evaluation of a model (there are many models, including both word and sentence, to be evaluated for an input frame) into the current time slots, we immediately free the current time−1 slots if they are not within the beam width. This is not necessary because they will eventually die from last_time not being updated to current time. However, if this is not done, then they can only be reused in the evaluation of next frame (current time+1). If this is done, they can be reused in the evaluation for current frame (current time). This immediate free is only done on current time−1 slots, not previous slots. This is because portions of the paths are shared. For example, suppose there is only one path before time 25, it then splits into two paths; one within beam width, one outside of the beam width. We can not back trace and free all of the paths that are outside of the search beam because before time 25 it is shared with a path that is within the beam. This is why the immediate free is done only on current time−1 slots, not any further back. FIG. 5 illustrates a known last time slot management scheme wherein the slot expansion starts with 1 at frame 1 and it expands to three slots at frame 2, 5 slots at frame 3 and 8 slots at frame 4. This continues on with expansions into hundreds or thousands of slots. The slots contain fields that contain the scores and the last time field indicating the last time updated. When a given expanded slot is determined as a good score, all of last time fields of the backtraced slots are given the current frame number and the last time fields of the bad scored slots are not given (not updated) the current frame number. After a current time t, t and t−1 are preserved but bad scored t−2 and back in time are made available for use. As indicated in FIG. 5, the top two descendents are bad scores so the score is reset to −2 to be reused in frame 4. The third from the top has a bad score and the fourth has a good score. Since they descend from the same node, they are both updated to 4 and not reused. As mentioned previously, hundreds of slots are allocated and freed. About 16 bits are needed to indicate the last time of every slot.

The bottom line usage of last_time is to compare with current time. In accordance with one embodiment of the present invention, we use one bit to represent whether a slot is available for reuse. 0 means it is available for reuse, 1 means it is being used. However, to replicate the above slot management mechanism with only two bits, two independent bits are required.

The first bit is used for slot allocation test and immediate free, basically it is for the processing of current time. Another bit is used for back trace update, basically it is preparation for the processing of current time+1. Let's call them A bit and B bit for each slot, the algorithm can be outlined as follows:

Reset A bits and B bits to 0 for all slots
for (input frame) {
    Reset B bits to 0 for all slots
    Whenever (a slot is needed) {
      if (A bit =0) { /* this slot is available */
        Set A bit and B bit to 1 for this slot
        Back trace to set B bits to 1 for all within beam paths
      }
    }
    Immediate free of <current time −1> slots by resetting A bits
    Copy S bits to A bits for the processing of next frame
}

The availability test is done on A bits. The immediate free is done on A bits because we want to reuse them for the evaluation of current frame; we do not want to wait until next frame to be able to use them. Back trace is done on B bits; it is for the processing of next frame, so we copy B to A at the end of current frame processing. If we use only A bits, and the back trace is also done on A bits; then the current time−2 and before slots will never be freed. This is because the immediate free is done only on current time−1 slots. The B bits are thus needed—they are reset to 0 at the beginning of every frame and back traced anew for every frame.

Figure 6:
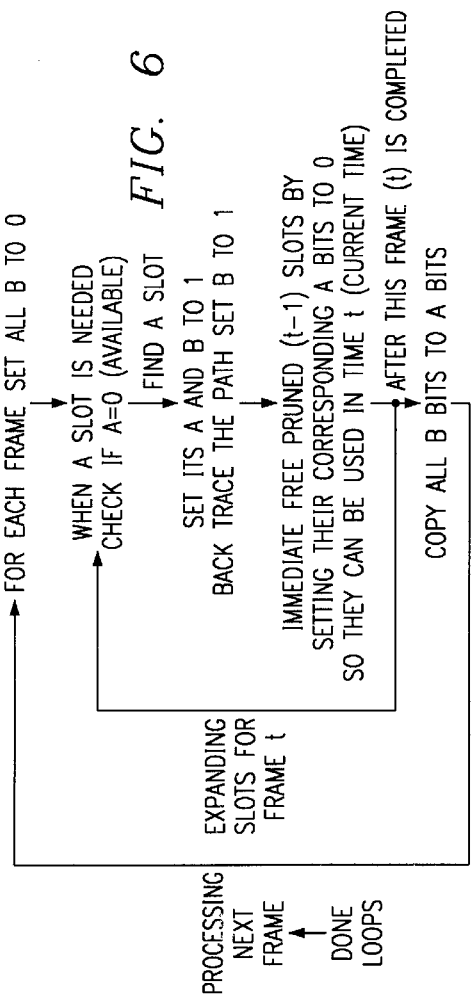
FIG. 6 is a flow chart illustrating last time two bit field operation according to one preferred embodiment of the present invention.

Referring to the flow chart of FIG. 6, for each recognition, all A and B bits are set to 0. When expanding slots for frame t, the program checks to see if A=0 (available) and then find a slot and set it's A and B bits to 1 and backtrace the path. Set B to 1. The next step is to free pruned (t−1) slots by setting their corresponding A bits to 0 so they can be used in time t (current time). This is done for all of the slots of the frame t. After the frame (t) is completed all the B bits are copied to A bits. To process the next frame all B bits are set to 0 and then the expansion of the next frame starts over.

After replacing last_time with bit fields, we tested the algorithm and it was working exactly the same by giving the same recognition results, scores, and peak slot usage counts for all the files. The peak slot count reported by the recognizer for every file is an exact count. For example, if peak slot count of 514 was reported for a file; then it will work fine if more than 514 slots were allocated. However, if 513 slots were allocated, it will run into slot overflow error.

Instead of the original definition with 8 fields, now we have a reduced slot definition with only 5 fields. In addition, we need 2 bits for each slot for the slot management. For example, if 1000 slots are allocated, 1000×2/16=125 words are needed. This new reduced slot can perform the exactly same algorithm with only very minor modification to the program.

```
struct slot {
    int       model_index_and_state_index;
    float     score;
    struct    slot *backptr;
    struct    slot *next_state;
    struct    slot *next_word;
}
```

We calibrated the peak slot usage on two tasks: single word military alphabet recognition (7087 files) and 10 continuous digits recognition: (1390 files).

For the single word military alphabet recognition task, the max, mean, and standard deviation of the peak slot usage are:

|  | max | Mean | std-dev |
|---|---|---|---|
| Minimum-network | 602 | 351 | 43 |

For the 10 continuous digits recognition task, the max, mean, and standard deviation of the peak slot usage are:

|  | max | Mean | std-dev |
|---|---|---|---|
| Minimum-network | 2308 | 638 | 216 |

Figure 7:
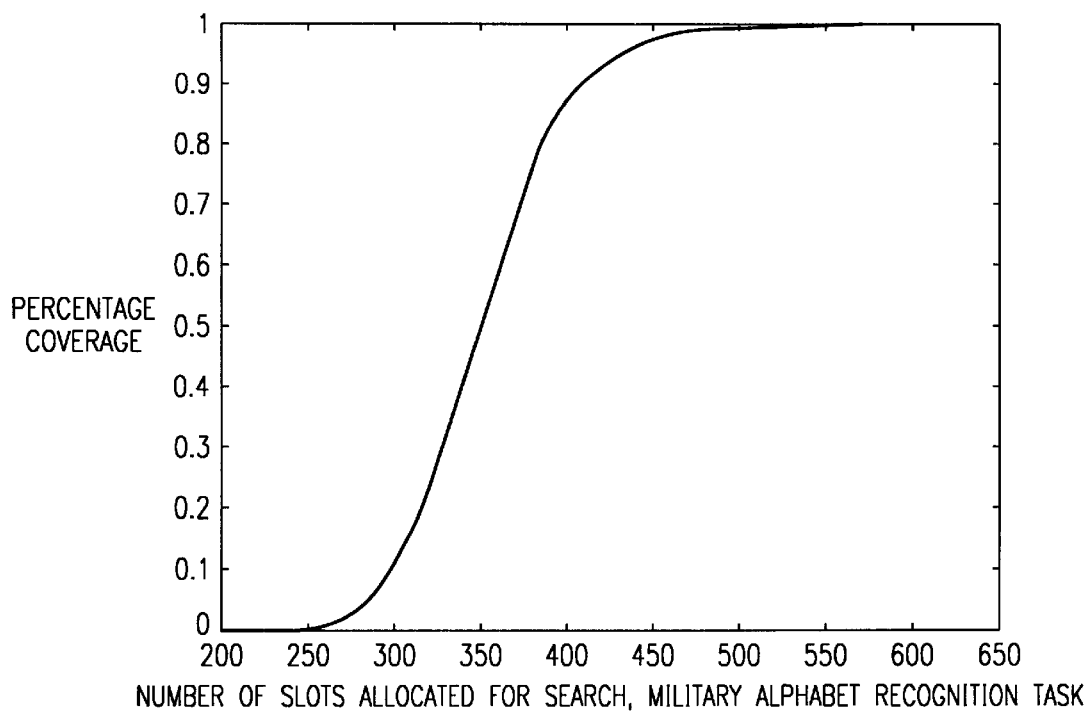
FIG. 7 is a plot of percentage coverage vs. number of slots allocated for search, military alphabet recognition task.
Figure 8:
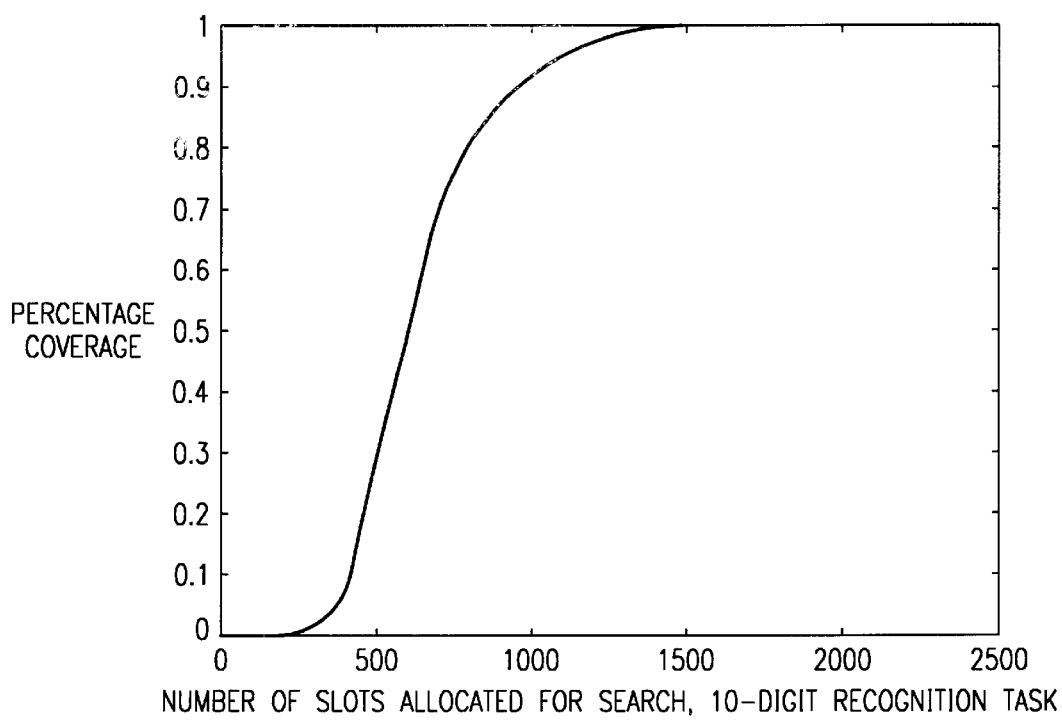
FIG. 8 is a plot of percentage coverage vs. number of slots allocated for search, 10-digit recognition task.

We also plot in FIGS. 7 and 8 the percentage of population (Y-axis) vs. peak slot count (X-axis) to illustrate the search RAM requirement for each task. For the single word military alphabet recognition task (FIG. 7), 500 slots, 500×5=2.5K word RAM, is sufficient. For the continuous 10-digit recognition task (FIG. 8), 1500 slots, 1500×5=7.5K word RAM, is sufficient.

In addition to the RAM for slots, we also need bits fields RAM to support the slot management mechanism. For example, 1500 slots mean 1500×2/16=188 word RAM.

What is claimed is:

1. A method of memory management of limited size memory for speech recognition wherein said memory stores for speech recognition a plurality of search frames where for each frame there is stored a slot data structure for each probable path from the previous frame and said slot data structure has predetermined data fields comprising the steps of:

providing for each slot a pair of bits for memory management; said slot being updated when a slot in an expanded frame is selected for further expansion or a recognition and all slots in the expansion path are updated; and coding a first bit of said pair of bits to indicate a slot is available and a second bit of said pair of bits to provide backtrace update.

2. The method of claim 1 including the step of packing model_index field and state_index field of said slot together.

3. The method of claim 2 wherein said model_index and state_index are packed into a 16-bit word giving each 8 bits and wherein said model_index and state_index are unpacked into 16 bits each if an 8-bit limit is reached.

4. The method of claim 1 wherein for each recognition setting said first bit and said second bit to a first level, for each new frame t setting said second bit to said first level and when expanding slots for a frame t checking said first bit of previously used slots to see if at said first level indicating an available slot and after finding a slot available and reusing said slot, setting said first bit and second bit to a second level, and then backtracing the expansion path setting all second bits to said second level and making available for memory reuse of time t−1 slots by setting corresponding first bits to said first level so they can be used in time t and continue expanding slots for frame t, after frame t is completed, copying all second bit values to said first bit and setting all second bits to said first value to process next frame and continue processing until end of all of the frames.

* * * * *